(12) United States Patent
Forster

(10) Patent No.: US 6,260,653 B1
(45) Date of Patent: Jul. 17, 2001

(54) HYDROSTATIC MOTOR UNIT

(75) Inventor: Franz Forster, Karlstadt-Muhlbach (DE)

(73) Assignee: Linde Aktiengesellschaft (DE)

( * ) Notice: Subject to any disclaimer, the term of this patent is extended or adjusted under 35 U.S.C. 154(b) by 0 days.

(21) Appl. No.: 09/426,358

(22) Filed: Oct. 25, 1999

(30) Foreign Application Priority Data

Oct. 26, 1998 (DE) .............................................. 198 49 334

(51) Int. Cl.$^7$ ........................... B60K 17/14; F16D 31/02
(52) U.S. Cl. ................................ 180/308; 60/442; 60/483
(58) Field of Search ........................... 180/308; 60/442, 60/483, 425; 91/498, 503, 506

(56) References Cited

U.S. PATENT DOCUMENTS 5,467,597 * 11/1995 Forster .................................... 60/442

FOREIGN PATENT DOCUMENTS 4235710 4/1994 (DE) .

* cited by examiner

Primary Examiner—Brian L. Johnson
Assistant Examiner—Matthew Luby
(74) Attorney, Agent, or Firm—Webb Ziesenheim Logsdon Orkin & Hanson, P.C.

(57) ABSTRACT

A hydrostatic motor unit designed as a wheel drive comprises at least two hydraulic motors, at least one of which has a variable capacity. The hydraulic motors can be switched hydraulically in parallel and have output rotors that can be coupled with each other. The invention teaches that the output rotors are oriented coaxially to one another and are connected to each other in rotational synchronization. The output rotors are preferably part of a one-piece rotor block that contains the work chambers of the two hydraulic motors. The motor unit consists of an internally pressurized, in particular multiple-stroke radial piston motor that has a constant capacity, and a reversible axial piston motor utilizing the swash plate construction that has an adjustable capacity. From a common, axially oriented control surface for the radial piston motor and the axial piston motor, there are hydraulic channels of approximately the same length that lead to the work chambers of the hydraulic motors. The control surface provided with pressure equalization grooves is formed on an axially movable control body, which can be pressed by spring force and hydraulic pressure toward a counter surface located on the rotor block. The rotor block is penetrated by a central recess, in which there are hydraulic lines that emerge in the control surface.

34 Claims, 1 Drawing Sheet

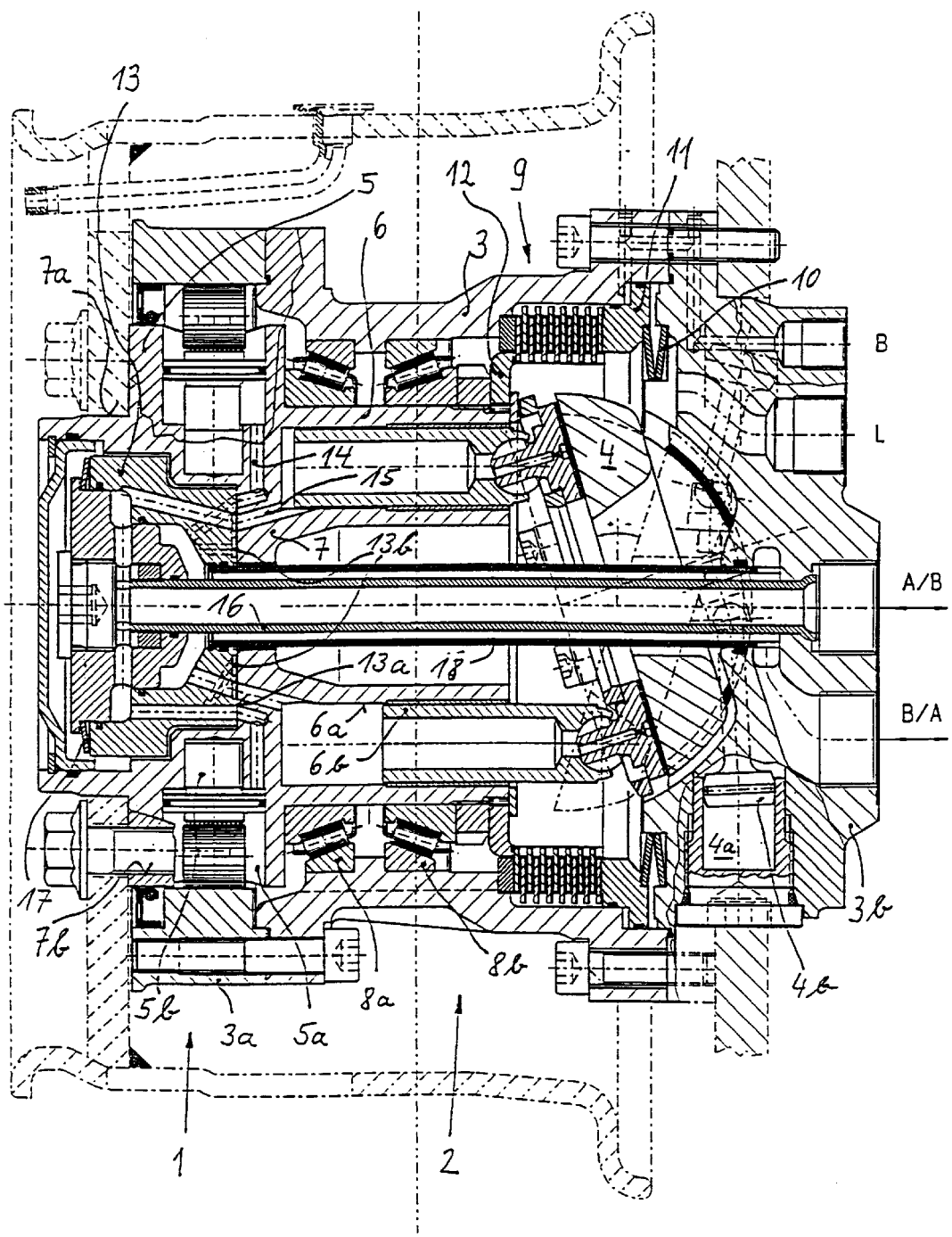

HYDROSTATIC MOTOR UNIT

BACKGROUND OF THE INVENTION

1. Field of the Invention

This invention relates to a hydrostatic motor unit, comprising at least two hydraulic motors, at-least one of which has a variable capacity, whereby the hydraulic motors can be switched hydraulically in parallel, and can have output rotors that are coupled with each other.

2. Background Information

Such a motor unit designed to be used as the central propulsion unit of a work machine is described in DE 42 35 710 A1. This prior art motor unit consists of a high-speed axial piston motor with a variable capacity and, located axially parallel to it, an internally pressurized low-speed radial piston motor with a constant capacity. The output shaft of the axial piston motor has a gear wheel engaged with gear teeth attached to the outer periphery of the rotationally mounted housing of the radial piston motor. The speed difference between the higher-speed motor and the lower-speed motor is equalized by a step-down transmission between the gear wheel and the gear teeth.

When the two motors are switched in parallel, the two hydraulic motors, depending on their individual capacity, each have an output moment. The two output moments are output together as the total output moment. The radial piston motor can be disconnected by separation from the hydraulic circuit and pressurization of the piston toward the internal top dead center position. The hydraulic fluid released is available for the axial piston motor. The axial piston motor, immediately before the deactivation of the radial piston motor, is set to the minimum capacity. When the radial piston motor is deactivated, the axial piston motor must be very quickly reset to the maximum capacity, to be able to absorb the additional hydraulic fluid from the radial piston motor without a switching pulse (which corresponds to synchronization). By a subsequent reduction of the capacity, and at a reduced total output moment of the motor unit, the output speed of rotation of the motor unit can be increased further with respect to the hydraulic parallel operation of the two hydraulic motors, and the conversion range of the motor unit can be increased.

The drive system experiences an interruption in the traction produced at the moment of the deactivation of the radial piston motor and the reduction of the axial piston motor. This interruption is undesirable in certain applications. For example, such applications include traction drive systems for work machines such as fork lift trucks, etc. Due to the potential resulting interruption in the braking force, a motor unit of the prior art cannot be used in traction drive systems that operate in a closed circuit and which are also used for operating brakes.

On account of their large size and the effort and expense involved in their construction, the motor unit described above is also unsuitable for applications where space is limited, e.g., in wheel drive systems. In most such cases, variable high-speed axial piston motors are used, downstream of which a step-down gear train is located.

The prior art also discloses the use of low-speed radial piston motors as wheel drives (direct drive). Radial piston motors, however, do not have a variable capacity with a multiple-stroke construction, which significantly limits the types of potential applications. In a single-stroke form, of course, the capacity can be varied. Although in that case, such drive systems represent high-speed motors, which require a subsequent stepping down, if the objective is to have low output speeds with a high output moment.

The object of this invention is to make available a hydrostatic motor unit of the type described above that is easy to manufacture, compact and can be used in a wide variety of applications.

SUMMARY OF THE INVENTION

The invention provides that the output rotors are oriented coaxially with one another and are connected to each other in rotational synchronization. Such a motor unit can, on one hand, be made small enough that it can be used as a wheel drive, for example, and it does not require any downstream gear train, and can also be used as a variable low-speed motor, i.e., it can be used at low output speeds for a high transmission of power.

The hydrostatic motor unit of the invention makes it possible to achieve an "internal" division of the output. When switched to operate hydraulically in parallel, the variable motor is thereby initially set to the maximum capacity. As a function of the ratio of the maximum capacity of the constant motor and the variable motor, and as a function of the output-side load of the motor unit, at a constant output power of a hydraulic pump that pressurizes the hydraulic motors there are defined output moments of the hydraulic motors which in this mode of operation are added to each other. Then, if the speed of a vehicle equipped with the motor unit of the invention is to be increased, the capacity of the variable motor is reduced continuously and without any interruption in traction. Accordingly, additional hydraulic fluid flows to the constant motor as a result of which the speed of rotation of the motor unit increases—as the output moment decreases.

The output rotors of the motor unit of the invention can be bolted to each other, for example, or they can be rotationally synchronized with each other in another manner. One method that is particularly easy in terms of fabrication and assembly is to have the output rotors be part of a one-piece rotor block that contains the work chambers of both hydraulic motors.

With regard to the compact size of the motor unit of the invention, at least one of the hydraulic motors may be a radial piston motor, in particular, an internally pressurized radial piston motor.

If the radial piston motor is a multiple-stroke unit, it has an advantageous effect on the power density of the motor unit. At low output speeds, as a result of the large capacity achieved by the multiple-stroke capability, the motor unit can produce a high output moment.

In one refinement of the invention, the radial piston motor can be shutdown partly or completely. The quantity of hydraulic fluid that is released by the partial or total shutdown of the radial piston motor is available to the other motor for a further increase of the output speed of the motor unit, which is a requirement for certain applications (e.g., for vehicles that are designed to operate at higher speeds).

In an additional embodiment of the invention, at least one of the hydraulic motors is an axial piston motor utilizing the swash plate design. Because axial piston machines are reliable and easily operated motors in terms of the variability of the capacity, in one configuration of the invention, the capacity of the axial piston motor is also variable. The axial piston motor can also be shutdown partly or completely.

The variable hydraulic motor may be reversible. In the reversed status, the direction of rotation of the output rotor remains the same, and the direction of flow of the hydraulic fluid in the variable motor is reversed. Consequently, additional hydraulic fluid can be supplied to the hydraulic motor which has a constant capacity, i.e., the variable motor operating in reverse acts as the pump driven by the output rotor of the constant motor, the "delivery volume" of which further increases the output speed of the motor unit. Consequently, in this operating mode, the conversion range, i.e. the range of speeds of the motor unit of the invention, is significantly expanded.

In one embodiment of the motor unit of the invention, which is advantageous in terms of ease of fabrication and assembly, the motor unit consists of an internally pressurized, multiple-stroke radial piston motor with a constant capacity, and an axial piston motor with a variable capacity that utilizes the swash plate design.

For certain types of applications, such as in connection with the use of the motor unit in vehicles that are designed to travel at higher speeds, the radial piston motor may have multiple banks, i.e. in two banks.

Consequently, in spite of the large capacity, the dimensions of the unit in the radial direction can be kept small. In addition, the axial piston motor can be made smaller if, for example, one bank of the radial piston motor can be turned off.

Moreover, if at least one bank of the radial piston motor can be turned off partly (i.e., with reference to individual pistons) and/or completely, and depending on the switching capabilities of the radial piston motor, there are a number of switching possibilities that can be realized, whereby the axial piston motor can then be used to regulate the various switching conditions.

If the output rotors that form the rotor block are axially next to one another, a plurality of hydraulic motors can easily be coupled to one another, which further increases both the power density and also the conversion range of the motor unit.

It is appropriate to provide a common, axially oriented control surface for the hydraulic motors. Such a control surface is easy to manufacture and easy to control in terms of the hydrostatic depressurization and leaks.

Irregularities in the response and operation of the two hydraulic motors can be prevented if hydraulic channels lead to the work chambers of the hydraulic motors from the control surface, which channels are of approximately equal lengths.

The control surface may be located at least partly radially inside an enveloping circle, the diameter of which is smaller than the radially inner enveloping circle of the work chambers of the radial piston motor. The result is short hydraulic channels, which keeps the flow and compression losses low and results in a compact construction.

In one embodiment, the control surface is formed on an axially movable control body, which can be pressed by spring force and hydraulic pressure in the direction of a counter-surface of the control surface, which is located on the rotor block.

The control surface is provided with pressure equalization grooves to prevent a tipping of the control body as a result of the pressure conditions and the resulting axial forces.

One embodiment of the invention achieves the maximum power output of the radial piston motor with the minimum dimensions. The work chambers of the radial piston motor are stepped, and a stepped piston is located in each of them, the smaller-diameter step of which is located radially inside the step with the larger diameter.

Stepped work chambers and stepped pistons for radial piston motors are themselves known in the prior art. They make possible an improved utilization of the space available toward the radial inside. With regard to the sequence of the pressurization of the stages of the piston, in such a realization it is advantageous if a hydraulic channel emerges into an annular space formed between the small and the large stages, and a connecting channel is provided between the annular space and a cylinder space formed in front of the end surface of the small stage.

Of course, it is also possible to form the radial piston motor with unstepped work chambers and unstepped pistons (which is the conventional construction).

The supply of hydraulic fluid to the motor unit of the invention can be in a compact manner by having a central recess that runs through the rotor block, in which hydraulic lines that emerge at the control surface are located. In one embodiment of this arrangement, a first hydraulic line is a plain conduit, the control-surface end of which is adjustably connected with an abutment for a spring, in particular a spring washer, that pressurizes the control block, and the other end of which is anchored in a hinged manner in a housing part. The plain conduit thus acts as a tie rod which absorbs the bias forces of the control block generated by the spring, and the axial forces generated by the hydraulic fluid, which tend to lift the control body away from the control surface. Radial movements of the control body are made possible by the hinged mounting of the plain conduit wherein in an easily fabricated configuration, the plain conduit is shaped spherically toward the radial outside for a hinged anchoring in the housing component. This configuration also makes possible an effective and reliable sealing action.

The space requirement for the hydraulic fluid supply can be further minimized if the first hydraulic line is surrounded concentrically by a second hydraulic fluid line.

With regard to the ease of manufacture of the motor unit of the invention, in one configuration, a housing is provided that surrounds the rotor block and has, in the vicinity of the swash plate, a cover, in which there are means for the adjustment of the swash plate. The space requirement can be minimized in the axial direction in particular by an arrangement in which the means to adjust the swash plate comprise two radially oriented actuator cylinders, and in each of them, there is an actuator piston that can move longitudinally in them and is effectively connected with the swash plate.

Additional advantages in terms of ease of fabrication and assembly can be achieved if the housing has a segment molded in it or fastened to it, on which a curved track of the radial piston motor is located.

In one embodiment, the invention provides a spring-loaded, hydraulically released multiple-disc brake between the housing and the rotor block.

In an arrangement that is optimal in terms of applications in wheel drives, the rotor block is rotationally mounted by a system of bearings, wherein the bearing system can absorb both internal forces and external forces. With regard to the ability to withstand high loads and still be small in size, the bearing system consists of two helical roller bearings, in particular two tapered roller bearings in an O-arrangement.

In one embodiment of the invention, the motor unit has a hydraulic motor with a constant capacity and a hydraulic motor with a variable capacity, wherein the capacity of the variable hydraulic motor is smaller than the capacity of the constant hydraulic motor, and wherein the adjustable hydraulic motor is reversible. In such a case, the result is a compact motor unit, wherein a relatively large hydraulic motor with a constant capacity interacts with a small hydraulic motor with a variable capacity. The variable hydraulic motor can also be used in reversing operation, which results in the maximum possible conversion range.

The advantages of the motor unit of the invention can be utilized particularly effectively when the motor unit is used as a wheel drive, in particular in machines such as industrial trucks, construction equipment and agricultural machines. The motor unit can thereby be installed essentially completely inside the wheel rim. For this application, the rotor block is provided with a rim centering device and axial threaded borings.

When the motor unit of the invention is used as a wheel drive, the wheel drive can be steerable.

BRIEF DESCRIPTION OF THE DRAWING

The invention and its advantages are described in greater detail below with reference to the exemplary embodiment illustrated in the accompanying schematic drawing.

DESCRIPTION OF THE PREFERRED EMBODIMENTS

The figure shows a motor unit of the invention which is intended for use as a wheel drive and consists of two hydraulic motors. In this exemplary embodiment, it consists of a combination of a hydraulic motor 1 which is an internally pressurized multiple-stroke radial piston motor that has a constant capacity and a hydraulic motor 2 which is an adjustable hydraulic motor that has a variable capacity. The latter hydraulic motor 2, the maximum capacity of which is less than the capacity of the hydraulic motor 1, is reversible, i.e. the capacity of the hydraulic motor 2 cannot only be reduced from a maximum value to zero, but it is also possible to adjust the motor beyond the zero point (to the maximum value in the opposite direction).

The variability of the capacity is achieved in this embodiment by varying the displacement volume of the hydraulic motor in question, i.e. by varying the piston stroke. It is also possible, however, within the teaching of the invention, to vary the capacity by control means while keeping the displacement volume unchanged.

The two hydraulic motors 1 and 2 have a common housing 3. Fastened to the left end of the housing 3 in the figure is a segment 3a, on the inside of which there is a curved track for the radial piston motor. The housing 3, on its right end in the figure, has a cover 3b, in which a pivoting swash plate 4 is mounted. The cover 3b is provided with means to adjust the swash plate 4 (two radial actuator cylinders 4a, one of which is shown in the figure, with actuator pistons 4b located in each cylinder). The cover 3b can be bolted to the vehicle, as a result of which the complete motor unit can be fastened to the vehicle. In contrast to the illustrated embodiment of the motor unit of the invention, which in this case is used as a non-steerable wheel drive, i.e. in a rigid form, it is also possible to realize the motor unit and thus the wheel drive so that they are steerable. In which case, the motor unit would be pivotable around a vertical axis.

The motor unit has an output rotor 5 of the radial piston motor and an output rotor 6, coupled with it, of the axial piston motor. The two output rotors 5 and 6 are oriented coaxially with each other, and are connected to each other in rotational synchronization. For this purpose, the two output rotors 5 and 6 which are axially next to one another are part of a common, one-piece rotor block 7.

In hydraulic parallel operation, the axial piston motor (hydraulic motor 2) is first set to the maximum capacity. Depending on the ratio of the maximum capacity of the two hydraulic motors 1 and 2, and as a function of the output-side load of the motor unit, with a constant output of the hydraulic pump pressurizing the hydraulic motors 1 and 2 and at a given output speed, specific drive moments of the two hydraulic motors 1 and 2 result. In this mode of operation, the drive moments are added to each other. If the output speed of the wheel drive is then to be increased, the capacity of the hydraulic motor 2 is continuously reduced without any interruption in the traction. Accordingly, the hydraulic fluid released flows to the hydraulic motor 1, as a result of which the speed of the motor unit increases as the output moment decreases.

To achieve a further increase in the speed of the motor unit, the adjustable hydraulic motor 2 is reversed, i.e. the swash plate 4 is not only pivoted back into the zero position, but is pivoted beyond the zero position in the opposite direction. Because the direction of rotation of the rotor block 7 does not thereby change, in the reversed mode of operation, the direction of flow of the hydraulic fluid in the hydraulic motor 2 is reversed, i.e. the hydraulic motor works as the pump driven by the output rotor 5 of the constant hydraulic motor 1, the "delivery volume" of which further increases the output speed of the motor unit. Consequently, in this mode of operation the conversion range, i.e., the range of speeds of the motor unit of the invention, is increased significantly.

In the illustrated embodiment, the output rotor 5 is provided with radial, stepped work chambers 5a, in each of which there is a stepped piston 5b of the radial piston motor. Of course, a conventional form of the work chambers and the pistons, i.e. without steps or graduations, is also possible. The output rotor is provided with axial work chambers 6a, in each of which there is a piston 6b of the axial piston motor.

The rotor block 7 is mounted by two tapered roller bearings 8a and 8b in an O-arrangement so that it can rotate in the housing 3. This system of bearings is sized so that both the external wheel loads and the internal power plant forces can be absorbed. By contrast, the wheel drive systems of the prior art have a large number of roller bearings.

On the left end of the rotor block 7 in the figure there are a wheel centering device 7a and axial threaded borings 7b for a wheel rim (shown in dotted lines).

Between the housing 3 and the rotor block 7 there is a multiple-disc brake, which can be released against a spring force (spring washers 10) by a hydraulically actuated brake piston 11. The brake discs of the multiple-disc brake 9 are non-rotationally coupled alternately with the housing 3 or with a driver connected with the rotor block 7, although they can move axially. It is also possible, as an alternative to or in addition to the parking brake illustrated, to have an operating brake in the motor unit of the invention. In the embodiment illustrated, the brake is located in the vicinity of the swash plate. It can also be installed in any other suitable location, however, such as axially between the tapered roller bearings 8a, 8b or in the vicinity of the radial piston motor (in front of it and/or behind it), or in the vicinity of the wheel centering device 7a.

Radially inside an enveloping circle, the diameter of which is smaller than the radial inner enveloping circle of the work chambers 5a of the radial piston motor, on a control body 13, there is a common, axially oriented control surface 13a for the radial piston motor and the axial piston motor.

This axial control surface 13a is easy to manufacture and easy to control in terms of hydrostatic depressurization and leaks. Also in the rotor block 7 there are short hydraulic channels 14 that run from the radial work chambers 5a of the radial piston motor to the control surface 13a and short hydraulic channels 15 that run from the axial work chambers 6a of the axial piston motor to the control surfaces 13a. This arrangement keeps the flow and compression losses small and results in a compact construction. The hydraulic channels 14, 15 to the two hydraulic motors 1 and 2 preferably have approximately equal lengths to prevent irregularities in the response and operation of the two hydraulic motors 1 and 2.

The stepped pistons 5b located in the stepped work chambers 5a of the radial piston motor 1 each have a smaller-diameter stage that is located radially inside a larger-diameter stage. The hydraulic channels 14 that lead to the control surface 13a emerge into an annular space formed between the small and the large steps. A connecting channel that runs between the annular space and a cylinder space formed in front of the end surface of the small stage ensures that the piston surface of each piston 5b, on which the hydraulic fluid acts, is as large as possible.

The control body 13 is axially movable and can be pressurized by spring force and hydraulic pressure toward a counter surface of the control surface 13a located on the rotor block 7.

To prevent a tipping of the control body 13 caused by the pressure conditions and the resulting axial forces, the control surface 13a is provided with pressurization grooves 13b.

The motor unit of the invention is supplied with hydraulic fluid by a central recess in the rotor block 7, in which there are hydraulic lines that emerge at the control surface 13a.

In this case, a first hydraulic line is a plain conduit 16, the control surface end of which is adjustably connected with an abutment for a spring 17, in particular a spring washer 10, that pressurizes the control body 13, and the other end of which is anchored in a hinged manner in the cover 3b. The plain conduit 16 thus acts as a tie rod which absorbs the bias forces of the control body 13 generated by the spring 17, and the axial forces generated by the hydraulic fluid, which tend to lift the control body 13 away from its counter surface on the rotor block 7.

Radial movements of the control body 13 are made possible by the hinged mounting of the plain conduit 16. For this purpose, the plain conduit 16 is formed spherically toward the radial outside in the cover 3b. This configuration also makes possible an effective and reliable sealing action. To complete the hydraulic fluid supply, the plain conduit 16 is surrounded concentrically by a second tube 18 also provided for the transport of hydraulic fluid.

All of the supply connections for the motor unit of the invention are located in the cover 3b.

It will be apparent to those of ordinary skill in the art that various changes may be made to the present invention without departing from the spirit and scope thereof. The described embodiments are illustrative of the invention and not restrictive thereof. Therefore, the scope of the present invention is defined by the appended claims and equivalents thereto.

I claim:

1. A hydrostatic motor unit comprising at least two hydraulic motors, at least one of which has a variable capacity, whereby the hydraulic motors can be switched hydraulically in parallel and have output rotors that can be coupled with each other, wherein the output rotors are oriented coaxially to one another and are connected to each other in rotational synchronization.

2. The hydrostatic motor unit as claimed in claim 1, wherein the output rotors are part of a one-piece rotor block that contains the work chambers of both hydraulic motors.

3. The hydrostatic motor unit as claimed in claim 1, wherein at least one of the hydraulic motors is a radial piston motor.

4. The hydrostatic motor unit as claimed in claim 3 wherein the radial piston motor is multiple-stroke.

5. The hydrostatic motor unit as claimed in claim 3, wherein the radial piston motor can selectively be turned off partly or completely.

6. The hydrostatic motor unit as claimed in claims 1, wherein at least one of the hydraulic motors is an axial piston motor that utilizes the swash plate construction.

7. The hydrostatic motor unit as claimed in claim 6, wherein the axial piston motor has an adjustable capacity.

8. The hydrostatic motor unit as claimed in claim 6, wherein the axial piston motor can selectively be turned off partly or completely.

9. The hydrostatic motor unit as claimed in claim 1, wherein the variable capacity hydraulic motor is reversible.

10. The hydrostatic motor unit as claimed in claim 1, wherein the motor unit includes of an internally pressurized, multiple-stroke radial piston motor that has a constant capacity, and an axial piston motor constructed on the swash plate principle that has an adjustable capacity.

11. The hydrostatic motor unit as claimed in claim 10, wherein the radial piston motor has a plurality of banks.

12. The hydrostatic motor unit as claimed in claim 11, wherein at least one of the motor banks can be turned off partly and/or completely.

13. The hydrostatic motor unit as claimed in claim 1 wherein the output rotors that form the rotor block are axially next to one another.

14. The hydrostatic motor unit as claimed in claim 1 further including a common, axially oriented control surface for the hydraulic motors.

15. The hydrostatic motor unit as claimed in claim 14 further including hydraulic channels that begin at the control surface lead to the work chambers of the hydraulic motors and are approximately the same length.

16. The hydrostatic motor unit as claimed in claim 14, wherein the one motor is a radial piston motor and the control surface is located at least partly radially inside an enveloping circle, the diameter of which is smaller than the radially inner enveloping circle of the work chambers of the radial piston motor.

17. The hydrostatic motor unit as claimed in claim 14, wherein the control surface is formed on an axially movable control body, which can be pushed by spring force and hydraulic pressure toward a counter-surface of the control surfaces located on the rotor block.

18. The hydrostatic motor unit as claimed in claim 14, wherein the control surface is provided with pressure equalization grooves.

19. The hydrostatic motor unit as claimed in claim 10, wherein the work chambers of the radial piston motor are stepped, and a stepped piston is located in each of them, the smaller-diameter stage of which is located radially inside the larger-diameter stage.

20. The hydrostatic motor unit as claimed in claim 19, wherein a hydraulic channel emerges in an annular space formed between the small and the large stage, and there is a connecting channel between the annular space and a cylinder space formed in front of the end surface of the small stage.

21. The hydrostatic motor unit as claimed in claim 14, wherein the rotor block is penetrated by a central recess, in which there are hydraulic lines that emerge in the control surface.

22. The hydrostatic motor unit as claimed in claim 21, wherein a first hydraulic line is a plain conduit, the control surface side end of which is adjustably connected with an abutment for a spring washer that acts on the control block, and the opposite end of which is anchored in a hinged manner in a housing component.

23. The hydrostatic motor unit as claimed in claim 22, wherein the plain conduit is spherical toward the radial outside.

24. The hydrostatic motor unit as claimed in claim 22, wherein the first hydraulic line is surrounded concentrically by a second hydraulic line.

25. The hydrostatic motor unit as claimed in claim 10, wherein there is a housing that surrounds the rotor block, which housing, in the vicinity of the swash plate, has a cover in which there are means to adjust the swash plate.

26. The hydrostatic motor unit as claimed in claim 25, wherein the means to adjust the swash plate comprises two radially oriented actuator cylinders and in each of which there is a longitudinally movable actuator piston that is effectively connected with the swash plate.

27. The hydrostatic motor unit as claimed in claim 25, wherein the housing has a segment on which there is a curved track for the radial piston motor.

28. The hydrostatic motor unit as claimed in claim 25, wherein between the housing and the rotor block there is a spring-loaded, hydraulically releasable multiple-disc brake.

29. The hydrostatic motor unit as claimed in claim 1, wherein the rotor block is rotationally mounted by a bearing system which can absorb the internal and external forces.

30. The hydrostatic motor unit as claimed in claim 29, wherein the bearing system consists of two helical tapered roller bearings in an O-arrangement.

31. The hydrostatic motor unit as claimed in claim 1, wherein the motor unit has a hydraulic motor that has a constant capacity and a hydraulic motor that has an adjustable capacity, whereby the capacity of the adjustable hydraulic motor is less than the capacity of the constant hydraulic motor, and wherein the adjustable hydraulic motor is reversible.

32. The hydrostatic motor unit as claimed in claim 1, wherein the hydrostatic motor unit forms part of a wheel drive.

33. The hydrostatic motor unit as claimed in claim 32, wherein the rotor block is provided with a rim centering device and axial threaded borings.

34. The hydrostatic motor unit as claimed in claim 32, wherein the wheel drive is steerable.

* * * * *